(12) United States Patent
Langer et al.

(10) Patent No.: US 8,789,230 B2
(45) Date of Patent: Jul. 29, 2014

(54) WHEEL WASHING APPARATUS

(71) Applicant: Alfred Kärcher GmbH & Co. KG, Winnenden (DE)

(72) Inventors: Christian Langer, Noerdlingen (DE); André Speckmaier, Wuestenrot (DE); Michael Heinze, Hemmingen (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 13/968,111

(22) Filed: Aug. 15, 2013

(65) Prior Publication Data

US 2013/0333127 A1 Dec. 19, 2013

Related U.S. Application Data

(63) Continuation of application No. PCT/EP2011/052379, filed on Feb. 17, 2011.

(51) Int. Cl.
*B60S 3/06* (2006.01)
(52) U.S. Cl.
USPC .......................................... 15/53.4
(58) Field of Classification Search
USPC ................................. 15/28, 53.4
See application file for complete search history.

(56) References Cited

U.S. PATENT DOCUMENTS

| | | | |
|---|---|---|---|
| 2,025,780 A | 12/1935 | Rosebrook | |
| 2,142,933 A | 1/1939 | Bickford | |
| 2,930,056 A | 3/1960 | Lappin | |
| 3,354,488 A * | 11/1967 | Bilde | 15/49.1 |
| 8,047,736 B2 | 11/2011 | Jordan | |
| 2010/0024139 A1* | 2/2010 | Linsbichler et al. | 15/31 |
| 2011/0035889 A1 | 2/2011 | Keusch | |

FOREIGN PATENT DOCUMENTS

| | | |
|---|---|---|
| DE | 37 40 627 | 6/1989 |
| DE | 20 2009 011 186 | 12/2010 |
| EP | 0 365 924 | 5/1990 |
| EP | 0 911 233 | 4/1999 |
| EP | 1 561 658 | 8/2005 |
| JP | 63 227449 | 9/1988 |

* cited by examiner

*Primary Examiner* — Randall Chin
(74) *Attorney, Agent, or Firm* — Womble Carlyle Sandridge & Rice, LLP

(57) ABSTRACT

A wheel washing apparatus is provided, including at least two washing brushes, each of which is capable of being driven in rotation about a brush axis, wherein the brush axes of the at least two washing brushes are different from one another. In order to provide a wheel washing apparatus which allows a better cleaning result to be achieved, it is proposed that the at least two washing brushes be capable of being driven in rotation about a common central axis which is different from the brush axes.

32 Claims, 6 Drawing Sheets

US 8,789,230 B2

WHEEL WASHING APPARATUS

CROSS-REFERENCE TO RELATED APPLICATIONS

This application is a continuation of international application number PCT/EP2011/052379, filed on Feb. 17, 2011, which is incorporated herein by reference in its entirety and for all purposes.

FIELD OF THE INVENTION

The present invention relates to a wheel washing apparatus, particularly for wheels of motor vehicles, comprising at least two washing brushes, each of which is capable of being driven in rotation about a brush axis, wherein the brush axes of the at least two washing brushes are different from one another.

BACKGROUND OF THE INVENTION

A wheel washing apparatus described in U.S. Pat. No. 2,025,780 comprises four washing brushes capable of being driven in rotation about different brush axes for cleaning the side face of the wheel to be cleaned. One of the washing brushes whose brush axis is capable of being brought into coincidence with the wheel axis of the wheel can contact the wheel in a centred position for cleaning. The remaining three washing brushes surround the first-mentioned washing brush in a circumferential direction of the brush axis thereof and can each clean the wheel in an off-centred position.

An object underlying the present invention is to provide a generic wheel washing apparatus which allows a better cleaning result to be achieved.

SUMMARY OF THE INVENTION

In an aspect of the invention, a wheel washing apparatus, particularly for wheels of motor vehicles, comprises at least two washing brushes, each of which is capable of being driven in rotation about a brush axis, wherein the brush axes of the at least two washing brushes are different from one another. At least two washing brushes are capable of being driven in rotation about a common central axis which is different from the brush axes.

BRIEF DESCRIPTION OF THE DRAWING FIGURES

The foregoing summary and the following description may be better understood in conjunction with the drawing figures, of which:

DETAILED DESCRIPTION OF THE INVENTION

Figure 1:
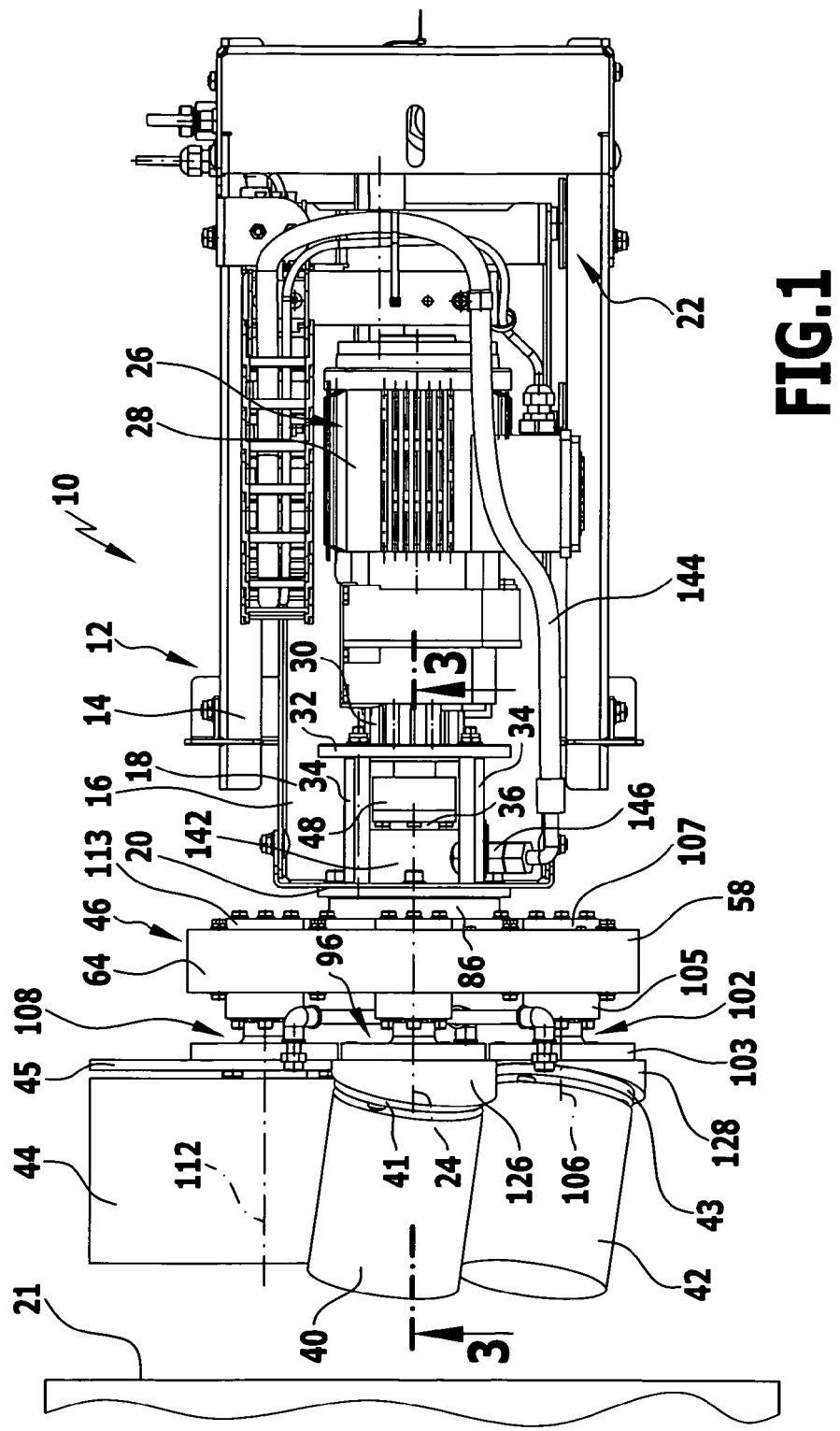
FIG. 1 is a top view of a first preferred embodiment of a wheel washing apparatus constructed in accordance with the invention.
Figure 2:
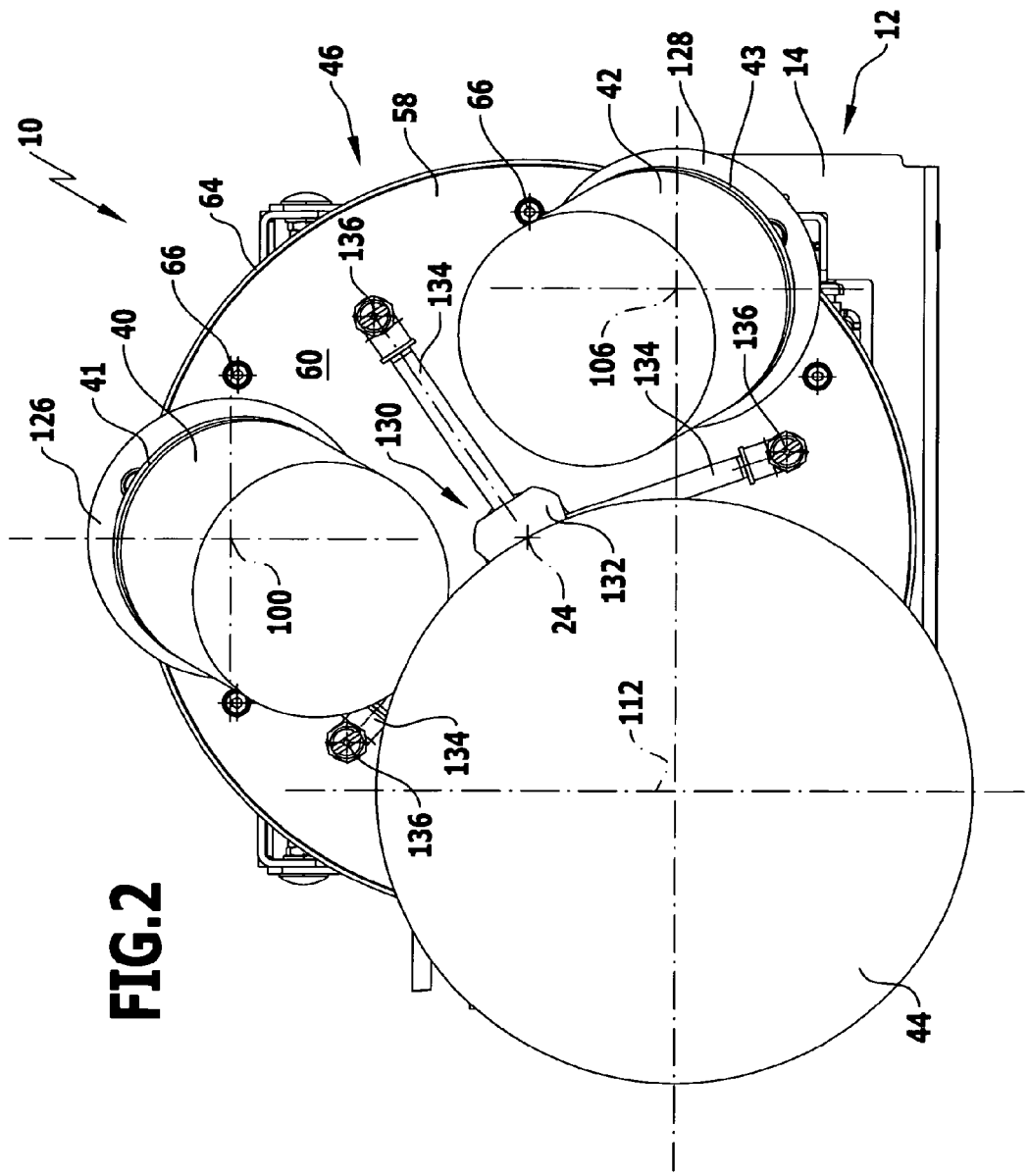
FIG. 2 is a front view of the wheel washing apparatus from FIG. 1, looked at from a wheel to be cleaned.
Figure 3:
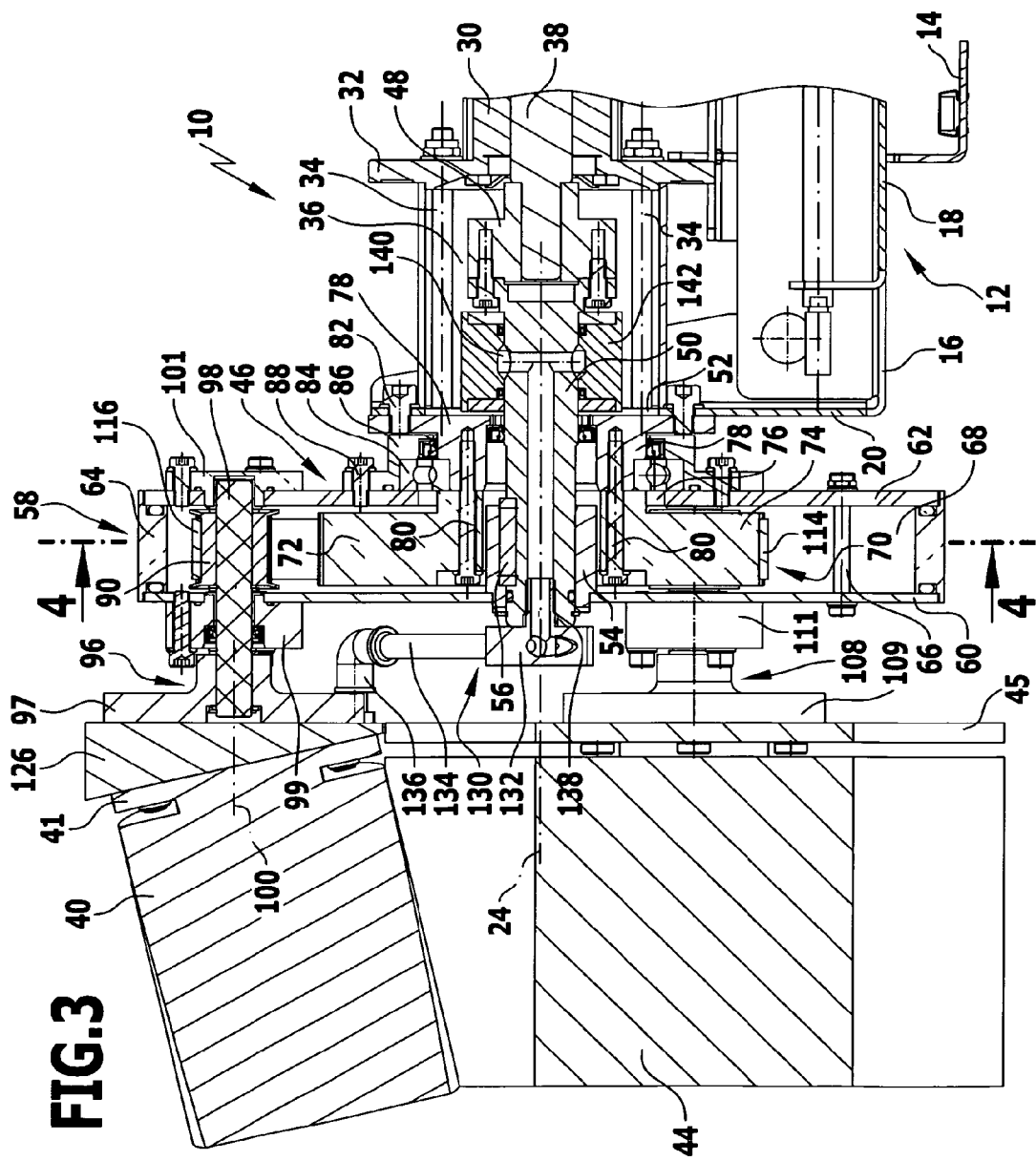
FIG. 3 is a sectional view taken along line 3-3 of FIG. 1.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a wheel washing apparatus, particularly for wheels of motor vehicles, comprising at least two washing brushes, each of which is capable of being driven in rotation about a brush axis, wherein the brush axes of the at least two washing brushes are different from one another. At least two washing brushes are capable of being driven in rotation about a common central axis which is different from the brush axes.

In the wheel washing apparatus constructed in accordance with the invention, the at least two washing brushes each perform superimposed movements. Each washing brush rotates about its own brush axis and in addition rotates about the common central axis of the wheel washing apparatus, which is different from the brush axis. For example, the common central axis can be brought into coincidence with a wheel axis of the wheel which is to be cleaned. It is thereby possible to clean the wheel over its entire surface in a circumferential direction of the wheel axis by at least two washing brushes revolving around the central axis, it being possible to achieve a particularly effective cleaning action by the rotation of the washing brushes around their own respective brush axis. As practice shows, even intricately designed rims of wheels to be cleaned can be cleaned effectively, even in the presence of spokes or hubs having recesses or undercuts, or in the area of the rim bed.

Provision may be made for the wheel washing apparatus to comprise three or more washing brushes. In a concrete implementation of the wheel washing apparatus, it has proven advantageous for the wheel washing apparatus to have three washing brushes which are each capable of rotating about a brush axis and about a common central axis different therefrom.

It is advantageous for at least two washing brushes to be configured to be of differing sizes, for example with brush discs of different diameters and/or wash bristles of different lengths. Washing brushes of differing sizes can have different cleaning effects on the wheel to be cleaned, for example for cleaning different structures. Uniform cleaning of the wheel can be ensured by rotating each of the washing brushes about the central axis.

Provision may be made for all of the washing brushes of the wheel washing apparatus to be configured to be of differing sizes.

In order to simplify the design of the wheel washing apparatus, it is preferred for at least two washing brushes to be configured to be identical to each other.

In an advantageous implementation of the wheel washing apparatus constructed in accordance with the invention, it has proven advantageous for the wheel washing apparatus to comprise three washing brushes, two of which are configured to be identical to each other. These may for example have brush discs having a diameter smaller than that of a brush disc of the remaining third washing brush, for example diameters of approximately 11 cm relative to a diameter of approximately 15 cm of the third washing brush.

It is advantageous for at least one washing brush to overlap the central axis in cross-section. The need for an additional central washing brush whose brush axis coincides with the central axis can thereby be eliminated for the wheel washing apparatus. This simplifies the design of the wheel washing apparatus. Using the at least one washing brush overlapping the central axis in cross-section, regions of the wheel to be cleaned that are located centrally near the wheel axis can be cleaned as said washing brush rotates around the central axis and about its own brush axis.

In a further preferred embodiment, provision may be made for the wheel washing apparatus to comprise a washing brush whose brush axis coincides with the central axis.

Preferably, at least one washing brush has a brush disc that is oriented obliquely with respect to its brush axis. As used herein, "obliquely" means that the brush disc, to which the wash bristles of the washing brushes are fixed, includes an angle of less than 90° with the brush axis. As a consequence of this, the brush disc and therefore the wash bristles perform a tumbling motion while the washing brush rotates about the brush axis. It has been shown that intricate rim structures, such as undercuts on the wheel to be cleaned, can be cleaned even better.

In a concrete implementation of the wheel washing apparatus, it has proven advantageous for the brush disc of a washing brush to include an angle of approximately 70° to approximately 80°, and preferably 75°, with the brush axis, for example in a washing brush having a diameter of the brush disc of approximately 11 cm.

Advantageously, the wheel washing apparatus comprises at least two washing brushes of differing sizes, with the larger washing brush having a brush disc oriented perpendicular to its brush axis and the smaller washing brush having a brush disc oriented obliquely with respect to its brush axis. By virtue of the oblique position of the brush disc of the smaller of the at least two washing brushes of differing sizes, the above-mentioned advantage can be achieved. The larger washing brush has a brush disc that is oriented perpendicular to its brush axis so that no tumbling motion of the brush disc and the wash bristles is performed during the rotation of the washing brush on its axis. Thus, the approach of the wheel washing apparatus to the wheel that is to be cleaned is not hindered by a tumbling motion of the brush disc of the larger washing brush. The tumbling motion of the smaller washing brush, however, is less obstructive to said approach and can be tolerated in order to achieve the above-mentioned enhanced cleaning effect.

In order to simplify the design of the wheel washing apparatus, it is advantageous for washing brushes of the same size to each have brush discs oriented at the same oblique angle relative to the respective brush axis.

Preferably, the brush axes of at least two and in particular all of the washing brushes are oriented parallel to one another. It has been shown that a simple design of the wheel washing apparatus can thereby be achieved, for example by the use of the gear device described hereinafter.

For the same reason, it is advantageous for at least one and in particular all of the brush axes to be oriented parallel to the central axis.

Advantageously, at least two and in particular all of the brush axes have identical distances from the central axis. A simple design of the wheel washing apparatus can thereby be ensured, for example by the use of the gear device described hereinafter. The identical distances of the at least two brush axes can in particular be independent of the size of the washing brushes having the respective brush axes.

Provision may be made for the brush axes to be spaced at uniform angular distances from one another in a circumferential direction of the central axis. This makes it possible for the design of the wheel washing apparatus to be as simple as possible and for the synchronous running thereof to be enhanced as much as possible. The uniform angular distances of the brush axes relative to one another with respect from the central axis can be independent of the respective distance of the brush axis from the central axis and/or independent of the respective diameter of the washing brush defining the brush axis.

Preferably, the rotational speeds of at least two and in particular all of the washing brushes about the respective brush axis are identical. For example, the rotational speeds amount to approximately 100 to approximately 200 revolutions per minute, preferably approximately 130 to approximately 170 revolutions per minute and in particular approximately 150 to 160 revolutions per minute in each case.

It is advantageous for the rotational speeds of at least two and in particular all of the washing brushes around the central axis to be identical. For example, the rotational speeds may amount to approximately 10 to approximately 50 revolutions per minute and preferably approximately 30 revolutions per minute in each case.

The at least two and in particular all of the washing brushes that are capable of being rotated about the central axis at the same rotational speed can be held on a common brush carrier capable of being driven in rotation. This allows the wheel washing apparatus to be of particularly simple design.

It is advantageous for the rotational speeds of the washing brushes about the respective brush axis to be greater than the rotational speeds of the washing brushes about the central axis. It has been shown that a better cleaning effect can thereby be achieved than for the reverse case.

In order to simplify their design, two or more washing brushes of the wheel washing apparatus preferably have a common drive device associated with them.

It is particularly advantageous for the wheel washing apparatus to have a drive device and a gear device coupling the drive device to the at least two washing brushes for driving the washing brushes around their respective brush axis. Using only a single drive device, the at least two washing brushes can be caused to rotate on their respective brush axes. This makes it possible to save the need for separate drives for each of the washing brushes.

Advantageously, the gear device comprises a planetary gear having planet wheels, each of which is coupled to a washing brush and capable of being driven in rotation about itself. The use of a planetary gear provides a simple design for causing the at least two washing brushes to rotate about their own respective brush axes by driving in rotation the planet wheels coupled to them in each case.

Preferably, the planet wheels are each connected to and rotationally fixed with respect to one of the washing brushes in order to achieve a simple design for transmitting a rotary motion of the planet wheels to the washing brushes. For example, each washing brush has associated with it a brush holder that is fixed to its brush disc and has a shaft supporting the respective planet wheel.

It is advantageous for the gear device to comprise a planet carrier on which the planet wheels are supported for rotation. On the one hand, this allows the gear device to be of rugged construction. On the other hand, the planet carrier can be driven in rotation in order to rotate the at least two washing brushes together about the central axis.

Preferably, the planet carrier is configured as a gear housing which at least partially houses the planetary gear in order to ensure as effective a protection as possible of the gear device against outside influences, in particular dirt and cleaning liquid. The gear housing is for example of drum-like configuration and is oriented coaxially with the central axis. Advantageously, housed in the gear housing are the planet wheels already mentioned, the bearing wheel mentioned hereinafter and the tractive-force transmission element mentioned hereinafter. The gear housing can be driven in rotation by the drive device in order to enable, as a rotatable planet carrier, the rotation of the at least two washing brushes about the central axis.

In an advantageous embodiment of the wheel washing apparatus constructed in accordance with the invention, the planetary gear comprises a drive wheel which is capable of being driven in rotation about the central axis by the drive device and on which the planet wheels roll. The drive wheel is preferably oriented coaxially with the central axis and is coupled to and rotationally fixed with respect to a drive shaft of the drive device. By rolling on the drive wheel, the planet wheels and thus the at least two washing brushes can be caused to rotate about their own axes. The planet wheels and the drive wheel can be configured for rolling on one another in the form of toothed wheels or friction rollers.

In a configuration of the gear device that has a simple design, the drive wheel is a sun wheel of the planetary gear whose axis is coincident with the central axis.

It is advantageous for the planetary gear to comprise a stationary bearing wheel on which the planet wheels roll. The bearing wheel is for example fixed to a supporting device of the wheel washing apparatus and serves as a counterbearing for the planet wheels. Driven by the drive wheel, the planet wheels are caused to rotate on their own axes and also to rotate about the central axis, thereby rolling on the drive wheel and on the bearing wheel. The bearing wheel allows the need for a separate drive for rotating the at least two washing brushes about the central axis to be obviated.

The bearing wheel, in particular in those instances where the drive wheel is a sun wheel, is an annulus wheel of the planetary gear.

In a variant of the embodiments of the wheel washing apparatus as explained above, provision may be made for the drive wheel to be an annulus wheel capable of being driven in rotation and for the bearing wheel to be a stationary sun wheel of the planetary gear.

In a different advantageous embodiment of the wheel washing apparatus constructed in accordance with the invention, provision may be made for the planet carrier to be capable of being driven in rotation about the central axis by the drive device, as has already been mentioned. This allows for common rotation of the at least two washing brushes about the central axis.

It is advantageous for the planetary gear to comprise a bearing wheel relative to which the planet wheels are spaced and at least one tractive-force transmission element coupling the bearing wheel to the planet wheels. The at least one tractive-force transmission element can run over the planet wheels and the bearing wheel and be in force-locking and/or positively-locking engagement therewith. In this way, under the rotation of the planet carrier about the central axis, the planet wheels and hence the washing brushes are caused to rotate about their own respective brush axis, with the bearing wheel serving as a counterbearing for the tractive-force transmission element. The bearing wheel is preferably fixed to a supporting device of the wheel washing apparatus.

Preferably, there is provided exactly one tractive-force transmission element, which runs over all of the planet wheels as well as the bearing wheel, coupling these to one another.

Preferably, the at least one tractive-force transmission element is a drive belt, which may for example be a flat belt, a V-belt or a toothed belt. In the latter case, the planet wheels and the bearing wheel can each be configured as toothed wheels. Using the drive belt as a tractive-force transmission element is cost-effective and provides ease of manufacturing.

In a variant of the above mentioned embodiment of the wheel washing apparatus, provision may be made for the at least one tractive-force transmission element to be a chain, wherein in this case the planet wheels and the bearing wheel are likewise configured as toothed wheels. It is also conceivable for the tractive-force transmission element to be configured as a rope.

The gear device can comprise at least one tensioning element for tensioning the at least one tractive-force transmission element. This allows the tractive-force transmission element to be placed under tension, thereby ensuring reliable tractive-force transmission between the planet wheels and the bearing wheel.

Also in the case of the variant of the wheel washing apparatus in which the planet carrier is capable of being driven in rotation about the central axis, an advantageous embodiment of the wheel washing apparatus may provide for the planetary gear to comprise a bearing wheel on which the planet wheels roll. By rolling on the bearing wheel, which is preferably fixed to a supporting device of the wheel washing apparatus, the planet wheels rotating around the central axis can be caused to rotate around their own axes. This makes it possible for the at least two washing brushes to be driven in rotation about their respective brush axis. To this end, the planet wheels and the bearing wheel are for example configured as toothed wheels or as friction rollers.

The preferably stationary bearing wheel is in particular a sun wheel of the planetary gear. It is also conceivable, however, for the preferably stationary bearing wheel to be an annulus wheel of the planetary gear.

The explanations given above show that in the present case, a gear device in which the planet wheels rotate about a common centre but do not roll on the sun wheel or on the annulus wheel in order to achieve this effect and/or rotation about their own axes is also to be thought of as a planetary gear. The embodiment of the wheel washing apparatus in which the planet wheels are arranged at a distance to the bearing wheel and are caused to rotate on their own axes by use of the tractive-force transmission element is also regarded as a planetary gear.

Preferably, the gear device comprises a gear shaft which is capable of being driven by the drive device and is oriented along the central axis. Also, the gear shaft can extend centrally through the gear device and can, on its side facing towards the washing brushes, be connected to and rotationally fixed with respect to the above-mentioned planet carrier.

It is advantageous for the gear shaft to be configured as a hollow shaft having at least one inlet opening for cleaning liquid on the side thereof facing away from the at least two washing brushes and at least one outlet opening for cleaning liquid on the side thereof facing towards the at least two washing brushes. In this way, cleaning liquid can be supplied through the hollow shaft to the area to be cleaned. This saves the need for a separate supply conduit for cleaning liquid. The cleaning liquid is in particular water to which a cleaning chemical can be added in order to enhance the cleaning effect.

Preferably, the wheel washing apparatus has a cleaning liquid distribution device which is held on the gear shaft on the side thereof facing towards the at least two washing brushes and to which cleaning liquid can be admitted via the gear shaft. From the cleaning liquid distribution device, which is advantageously coupled to and rotationally fixed with respect to the gear shaft, cleaning liquid can be dispensed specifically in a direction towards the wheel to be cleaned.

It is advantageous for the cleaning liquid distribution device to comprise at least one spray arm provided with an outlet nozzle for cleaning liquid. The outlet nozzle of the spray arm is preferably arranged between two washing brushes so that emerging cleaning liquid can be delivered past the washing brushes to the wheel that is to be cleaned. By way of example, there are provided as many spray arms as there are washing brushes, with the spray arms in each case being staggered with respect to the washing brushes relative to a circumference of the central axis.

FIG. 1 is a top view of a first preferred embodiment of a wheel washing apparatus constructed in accordance with the invention, generally designated by the reference numeral 10, in particular for cleaning wheels of motor vehicles.

The wheel washing apparatus 10 comprises a supporting device 12 having a stationary supporting part 14 and a movable supporting part 16 movable relative to said stationary support part 14. The stationary supporting part 14 is for example a frame structure, known per se, by which the wheel washing apparatus 10 can be fixed on a suitable supporting surface, which may for example be a mounting base in a motor vehicle wash hall. The movable supporting part 16 may likewise be configured as a frame structure or, as in the present case, as a kind of slide-out structure having a horizontal base plate 18 which merges, at an end thereof, into a vertical front plate 20.

As used herein, positional and directional terms, such as "above", "below", "horizontal", "vertical" and the like, are to be understood to relate to a position of use of the wheel washing apparatus 10 in which the base plate 18 is oriented parallel to a commonly horizontal supporting surface for the wheel washing apparatus 10 and is therefore oriented horizontally. As used herein, the terms "front" and "front side" in each case refer to a side of the wheel washing apparatus 10 facing towards the wheel 21 to be cleaned or part thereof, and the terms "rear or "rear side" refer to a side of the wheel washing apparatus 10 facing away from the wheel 21 to be cleaned or part thereof.

The movable supporting part 16 is movably supported on the stationary supporting part 14 in a manner known per se. The movable supporting part 16 can be moved relative to the stationary supporting part 14 along a horizontally oriented central axis 24 by way of a roller drive 22. This allows the movable supporting part 16 including the components of the wheel washing apparatus 10 attached thereto, which are described hereinafter, to be moved towards and away from the wheel 21 to be cleaned.

Fixed on the supporting part 16 is a drive device 26 comprising a drive motor 28. To this end, the drive motor 28 comprises a holding ring 32 integrally formed on a motor housing 30 on a side thereof facing towards the front plate 20. The holding ring 32 is fixedly connected to the front plate 20 by screw-like or bolt-like connecting elements 34. The holding ring 32 is, however, spaced relative to the front plate 20 so that a space 36 is formed between the front plate 20 and the holding ring 32.

A drive shaft 38 of the drive motor 28 defines the central axis 24 of the wheel washing apparatus 10 already mentioned. By way of the drive shaft 38, three washing brushes 40, 42 and 44 comprised by the wheel washing apparatus 10 are capable of being driven in rotation, in each case about themselves as well as together about the central axis 24, in a manner described hereinafter. The washing brushes 40, 42 and 44 comprise brush discs 41, 43 and 45 respectively having wash bristles, schematically shown, attached thereto in a manner known per se.

The wheel washing apparatus 10 has a gear device 46 for transmitting a driving force from the drive shaft 38 to the washing brushes 40, 42 and 44.

The drive shaft 38 extends through the holding ring 32 and protrudes into the space 36. A coupling sleeve 48 of the gear device 46 is coupled to the drive shaft 38 at an end thereof and is rotationally fixed with respect to said drive shaft 38. Flange-mounted to and rotationally fixed with respect to the coupling sleeve 48 is, at the front side thereof, a gear shaft 50 whose axis coincides with the central axis 24 of the drive shaft 38. The gear shaft 50 extends from the space 36 through a through-hole 52 formed in the front plate 20, thereby projecting beyond the movable supporting part 16 in a direction towards the wheel 21 to be cleaned.

At is front end facing away from the coupling sleeve 48, the gear shaft 50 is connected to and rotationally fixed with respect to a hub 54 comprised by the gear device 46. In the present case, the connection is a keyway-and-key connection, of which a key 56 is also illustrated.

The gear device 46 further comprises a gear housing 58 which is of drum-like configuration. The gear housing 58 has a plate-like, round front housing wall 60 and, arranged at a distance therefrom, a rear housing wall 62 which likewise has a plate-like and round configuration. The front housing wall 60 faces towards the wheel 21 to be cleaned, whereas the rear housing wall 62 faces away from the wheel 21 to be cleaned and itself faces towards the front plate 20 of the movable supporting part 16.

The gear housing 58 further comprises a side wall 64 interconnecting the housing walls 60 and 62 and surrounding the central axis 24 annularly. In addition, the housing walls 60 and 62 are connected together by a plurality of for example bolt-like connecting elements 66 which are arranged in a circumferential direction of the central axis 24.

The gear housing 58 encloses a housing interior space 68 sealed against dirt and cleaning liquid, said housing interior space 68 having the gear shaft 50 centrally extending therethrough and also having the hub 54 extending thereinto. At its front side facing away from the front plate 20, the hub 54 is connected to and rotationally fixed with respect to the front housing wall 60, for example by screws (not shown). This makes it possible for the gear housing 58 to be driven in rotation around the central axis 24. To this end, the drive shaft 38 drives the coupling sleeve 48, the gear shaft 50, the hub 54 and thus the gear housing 58.

Further transmission of the driving force from the drive shaft to the washing brushes 40 to 44 is by way of a planetary gear 70 of the gear device 46. The planetary gear 70 has a stationary bearing wheel 72 in the form of a sun wheel 74 which is provided with external teeth and whose axis is coincident with the central axis 24. The sun wheel 74 is housed in the housing interior space 68, thereby surrounding the gear shaft 50 and the hub 54. The sun wheel 74 is fixedly connected to a holding flange 78 through a through-opening 76 formed in the rear housing wall 62, using for example connecting elements 80 in the form of screws, as in the present case. The holding flange 78 also surrounds the gear shaft 50 and itself is fixedly connected to the front plate 20 using for example connecting elements 82 likewise in the form of screws.

Adjacent to the rear housing wall 62, the holding flange 78 is surrounded by a bearing ring 84. The bearing ring 84 serves to support an outer ring 86 which occupies the space between the front plate 20 and the rear housing wall 62, to which it is connected in rotationally fixed relation by screw-like connecting elements 88. Via the outer ring 86, the gear housing 58 can thus be supported on the holding flange 78 as it rotates about the central axis 24.

The planetary gear 70 further comprises three planet wheels 90, 92 and 94, each of which is associated with one of the washing brushes 40, 42 and 44 respectively and coupled thereto in rotationally fixed relation. The planet wheels 90 to 94 are also housed in the housing interior space 68 and comprise external teeth. They are each spaced relative to the sun wheel 74 so that they are not in engagement therewith.

For coupling the washing brushes 40 to 44 to the planet wheels 90 to 94 and rotationally fixing them with respect thereto, the washing brushes 40, 42 and 44 have associated with them brush holders 96, 102 and 108 respectively of identical configuration.

The brush holder 96 is indirectly connected to the brush disc 41 of the washing brush 40 and has to this end a holding element 97 external to the gear housing 58. The holding element 97 is disc-shaped and connected to and rotationally fixed with respect to a shaft 98 of the brush holder 96. The shaft 98 is supported for rotation on the gear housing 58 by a bearing block 99 which is fixed to the front housing wall 60 on the outside thereof. An axis of the shaft 98 defines a brush axis 100 of the washing brush 40. The shaft 98 extends through the front housing wall 60 and into the housing interior space 68, and the planet wheel 90 is held on and rotationally fixed with respect to the shaft 98 so that the axis of the planet wheel 90 is coincident with the axis of the shaft 98 and therefore with the brush axis 100. The shaft 98 is further supported on a bearing block 101 fixed to the rear housing wall 62 on the outside thereof.

Correspondingly, the washing brush 42 is supported for rotation on the gear housing 58 via its brush disc 43 and the brush holder 102. To this end, there are provided a corresponding holding element 103, a shaft 104, a bearing block 105 at the housing wall 60 and a bearing block 107 at the housing wall 62. The planet wheel 92 is mounted to and rotationally fixed with respect to the shaft 104 so that their common axes define a brush axis 106 of the washing brush 42.

Further, correspondingly, the washing brush 44 is supported for rotation on the gear housing 58 by way of the brush holder 108. In a manner corresponding to what has been described above, there are provided a holding element 109, a shaft 110, a bearing block 111 at the housing wall 60 and a bearing block 113 at the housing wall 62. The planet wheel 94 is mounted to and rotationally fixed with respect to the shaft 110. Their axes coincide and define a brush axis 112 on which the washing brush 44 is capable of being rotated relative to the gear housing 58.

Thus, the gear housing 58 together with the brush holders 96, 102 and 108 forms a planet carrier for the planet wheels 90, 92 and 94.

The brush axes 100, 106 and 112 and the central axis 24 are oriented parallel to one another in pairs, extending horizontally in each case. The brush axes 100, 106 and 112 are equidistant from the central axis 24, and every two brush axes 100, 106 and 112 are at identical angular distances from each other in a circumferential direction of the central axis 24.

As has already been mentioned, the gear housing 58 and thus the washing brushes 40, 42 and 44, when driven by the drive shaft 38, can be rotated around the central axis 24. In addition, the washing brushes 40, 42 and 44 can be rotated on their own axes, i.e., about brush axis 100, 106 and 112 respectively, by way of the planetary gear 70. To the latter end, the planetary gear 70 has a tractive-force transmission element 114. In the present case, the latter is configured in the form of a drive belt 116 which has, although not shown in the drawing, internal teeth relative to the central axis 24 and is therefore a toothed belt.

The drive belt 116 is in positively locking engagement with the sun wheel 74 and in each case with the side of the planet wheels 90 to 94 facing away from the central axis 24. This makes it possible for the sun wheel 74 to be coupled to the planet wheels 90 to 94 by transmitting tractive forces between the sun wheel 74 and the planet wheels 90 to 94. The gear device 46 may comprise one or more tensioning elements 118 and 120 in order to ensure sufficient tension of the drive belt 116. The tensioning elements 118 and 120 are configured as tensioning pulleys 122 and 124 respectively near the planet wheels 90 and 92. The tensioning pulleys 122 and 124 can be applied to the drive belt 116 on the side thereof facing away from the central axis 24 so that the drive belt 116 is always under sufficient tension and its engagement with the sun wheel 74 and the planet wheels 90 to 94 is ensured.

With the gear housing 58 rotating about the central axis 24, the drive belt 116 rolls both on the stationary sun wheel 74, which forms the bearing wheel 72, and on the planet wheels 90, 92 and 94, each of which is supported for rotation on the gear housing 58. As a result of this, under the rotation of the gear housing 58 about the central axis 24, the planet wheels 90, 92 and 94 and thus the washing brushes 40, 42 and 44 respectively are at the same time rotated around the brush axes 100, 106 and 112 respectively.

From the above explanations it is clear that the planetary gear 70 is regarded as such because of the rotation of the planet wheels 90, 92 and 94 about the central axis and about the brush axes 100, 106 and 112 respectively, even though in this process the planet wheels 90, 92 and 94 do not roll on the sun wheel 74 and transmission of force is instead effected through the drive belt 116.

The planet wheels 90, 92 and 94 are of identical diameter and have an identical number of teeth. Therefore, the rotational speeds of the washing brushes 40, 42 and 44 are identical, amounting for example to approximately 160 revolutions per minute at a rotational speed of the drive shaft 38 of approximately 30 revolutions per minute. Accordingly, the rotational speed of the gear housing 58 and thus the washing brushes 40, 42 and 44 about the central axis 24 also corresponds to approximately 30 revolutions per minute.

In the following, the washing brushes 40, 42 and 44 will be discussed in more detail. The washing brushes 40 and 42 are of identical configuration and have brush discs 41 and 43 respectively with a diameter of approximately 11 cm each. The brush disc 41 is oriented obliquely with respect to the brush axis 100 of the washing brush 40, i.e., it makes an angle with the brush axis 100 that deviates from 90°. In the present case, the angle between the brush axis 100 and the brush disc 41 is approximately 75°. This is achieved by having a wedge-shaped intermediate member 126 arranged between the brush disc 41 and the holding element 97 of the brush holder 96. Via the intermediate member 126, said holding element 97, which is oriented perpendicular to the brush axis 100, is indirectly connected to the brush disc 41.

In a corresponding manner, a wedge-shaped intermediate member 128 is arranged between the holding element 103 of the brush holder 102 and the brush disc 43 of the washing brush 42. Therefore, the brush disc 43 is also inclined by an angle of approximately 75° relative to the brush axis 106.

On the other hand, the brush disc 45 of the washing brush 44 is oriented perpendicular to the brush axis 112. The brush disc 45 has a diameter of approximately 15 cm. This is less than the distance of the brush axis 112 from the central axis 24 so that the washing brush 44 overlaps the central axis 24 in cross-section.

Using the wheel washing apparatus 10 constructed in accordance with the invention, effective cleaning of the wheel to be cleaned can be accomplished. This is achieved by the washing brushes 40, 42 and 44 in each case being capable of rotating about their own brush axes 100, 106 and 112 respectively while being capable of simultaneously and together rotating about the central axis 24. It has proven advantageous for the own rotational speeds of the washing brushes 40, 42 and 44 to be substantially greater than the common rotational speed about the central axis 24. Even structures of intricate design, such as undercuts and recesses found in particular in light-alloy rims, can thereby be cleaned effectively.

Enhancing the cleaning effect can also be accomplished in particular by the oblique position of the washing brushes 40 and 42. Due to the intermediate members 126 and 128, the washing brushes 40 and 42, when rotated about their axes, perform a tumbling motion which allows for an even more effective cleaning of intricately shaped structures of the wheel to be cleaned. By virtue of the tumbling motion, the washing brushes 40 and 42 can very easily get into and clean depressions of the rim of the wheel to be cleaned. Effective cleaning of the rim bed is also possible.

A cleaning liquid distribution device 130 is provided for further enhancement of the cleaning effect of the wheel washing apparatus 10. The cleaning liquid distribution device 130 is coupled to and rotationally fixed with respect to the front end of the gear shaft 50, facing away from the drive shaft 38, by a liquid distribution member 132. At one end thereof, the liquid distribution member 132 extends into the gear shaft 50 configured as a hollow shaft. On the opposite end thereof, the liquid distribution member 132 has three spray arms 134 of the cleaning liquid distribution device 130 projecting therefrom in a radiating manner with respect to the central axis 24. The spray arms 134 are in each case staggered with respect to the washing brushes 40, 42 and 44 relative to the central axis 24. Arranged at the free ends of the spray arms 134 are outlet nozzles 136 which point in a direction towards the wheel to be cleaned.

The gear shaft 50, as a hollow shaft, has an outlet opening 138 for cleaning liquid on the side thereof facing away from the drive shaft 38. Further, the gear shaft 50 has an inlet opening 140 for cleaning liquid which is located about midway between the coupling sleeve 48 and the front plate 20. Between the front plate 20 and the coupling sleeve 48, the gear shaft 50 is surrounded by an annular connection sleeve 142. A supply conduit 144 for cleaning liquid is connected to the connection sleeve 142 by a connecting element 146. In the present case, the cleaning liquid is water to which a cleaning chemical may be added in order to enhance the cleaning effect. The cleaning liquid can enter the gear shaft 50 through the supply conduit 144, the connecting element 146 and the connection sleeve 142, flowing through said gear shaft 50 and into the cleaning liquid distribution device 130, from which it can be dispensed onto the wheel to be cleaned.

Figure 4:
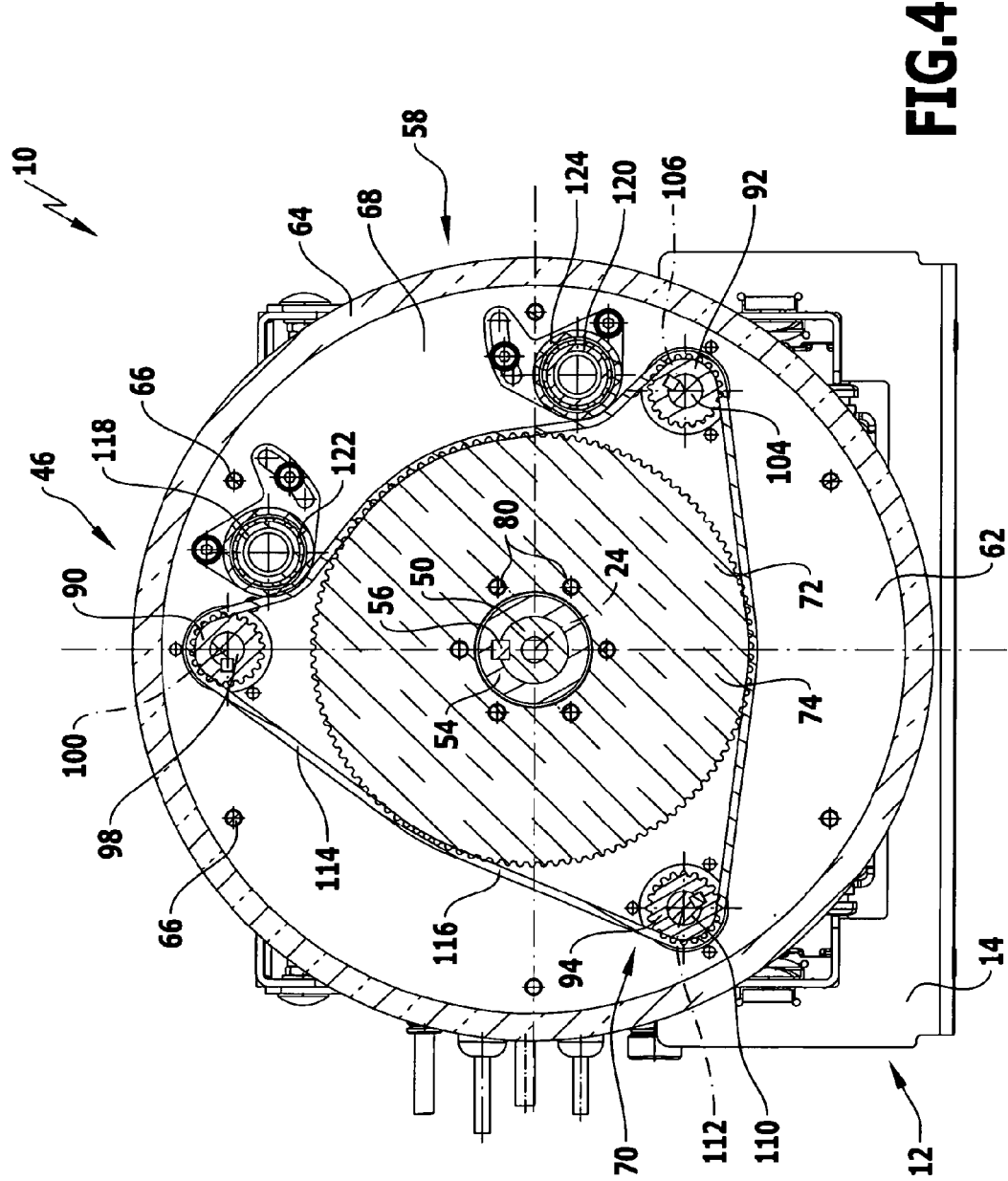
FIG. 4 is a sectional view taken along line 4-4 of FIG. 3.
Figure 5:
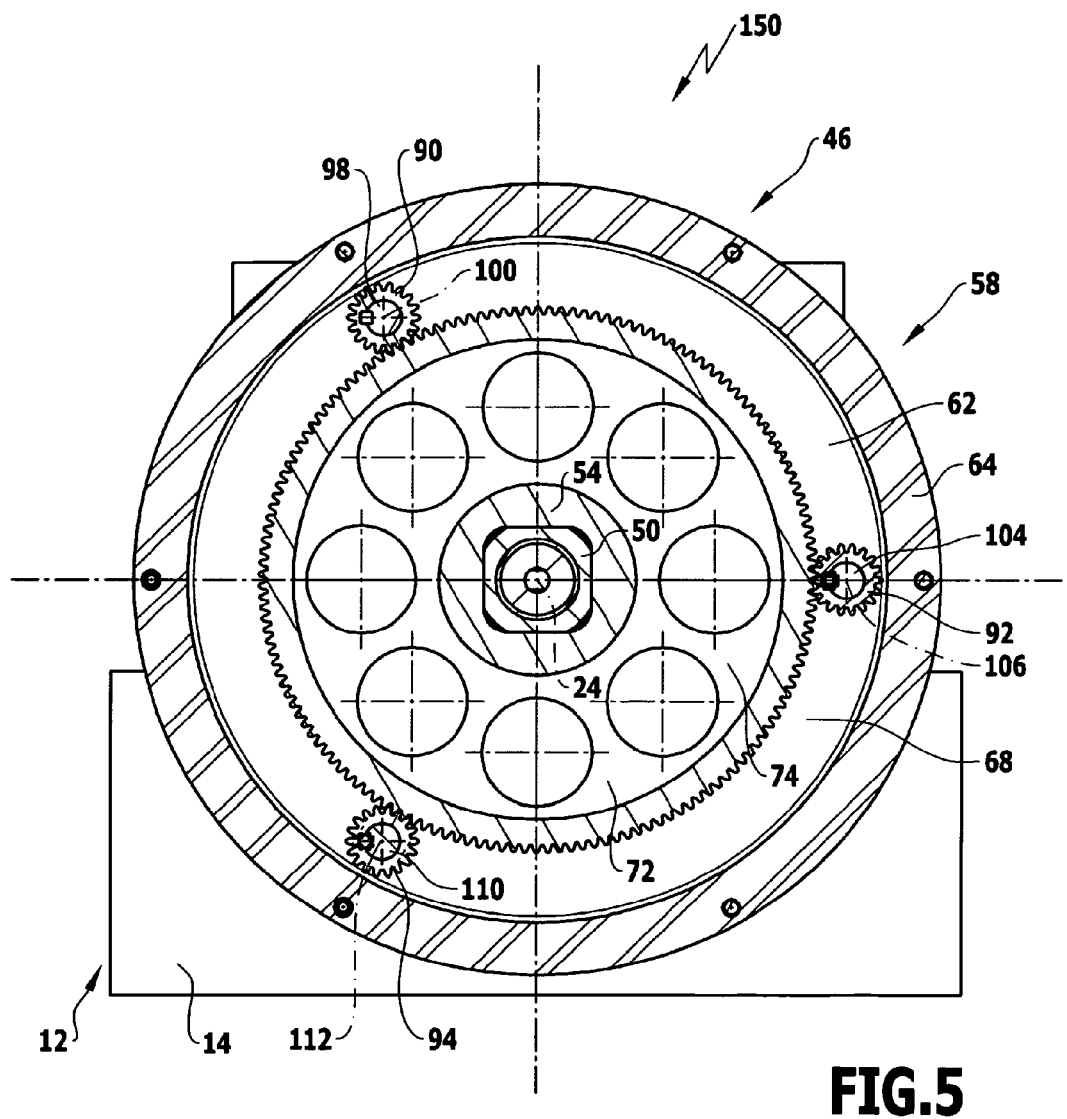
FIG. 5 is a sectional view of a second preferred embodiment of a wheel washing apparatus constructed in accordance with the invention, corresponding to FIG. 4.

In a manner corresponding to FIG. 4, FIG. 5 shows a simplified sectional view of a second preferred embodiment of a wheel washing apparatus constructed in accordance with the invention, designated by the reference numeral 150. The same reference numerals are used for features or components of the wheel washing apparatuses 10 and 150 that are identical or functionally equivalent. The advantages that can be achieved with the wheel washing apparatus 10 can also be achieved with the wheel washing apparatus 150.

Unlike in the wheel washing apparatus 10, the planet wheels 90, 92 and 94 of the wheel washing apparatus 150 are in permanent engagement with the stationary sun wheel 74. Driving the gear housing 58 of the wheel washing apparatus 150 also effects rotation of the planet wheels 90, 92 and 94 about the central axis 24. In addition, the planet wheels 90, 92 and 94 mesh with the sun wheel 74 so that they are caused to rotate on their own axes. As a result, the washing brushes 40, 42 and 44 are rotated about the brush axes 100, 106 and 112 respectively, while the gear housing 58 is rotated about the central axis 24.

Otherwise, the wheel washing apparatus 150 functions like the wheel washing apparatus 10 so that in this respect reference can be made to the above explanations.

Figure 6:
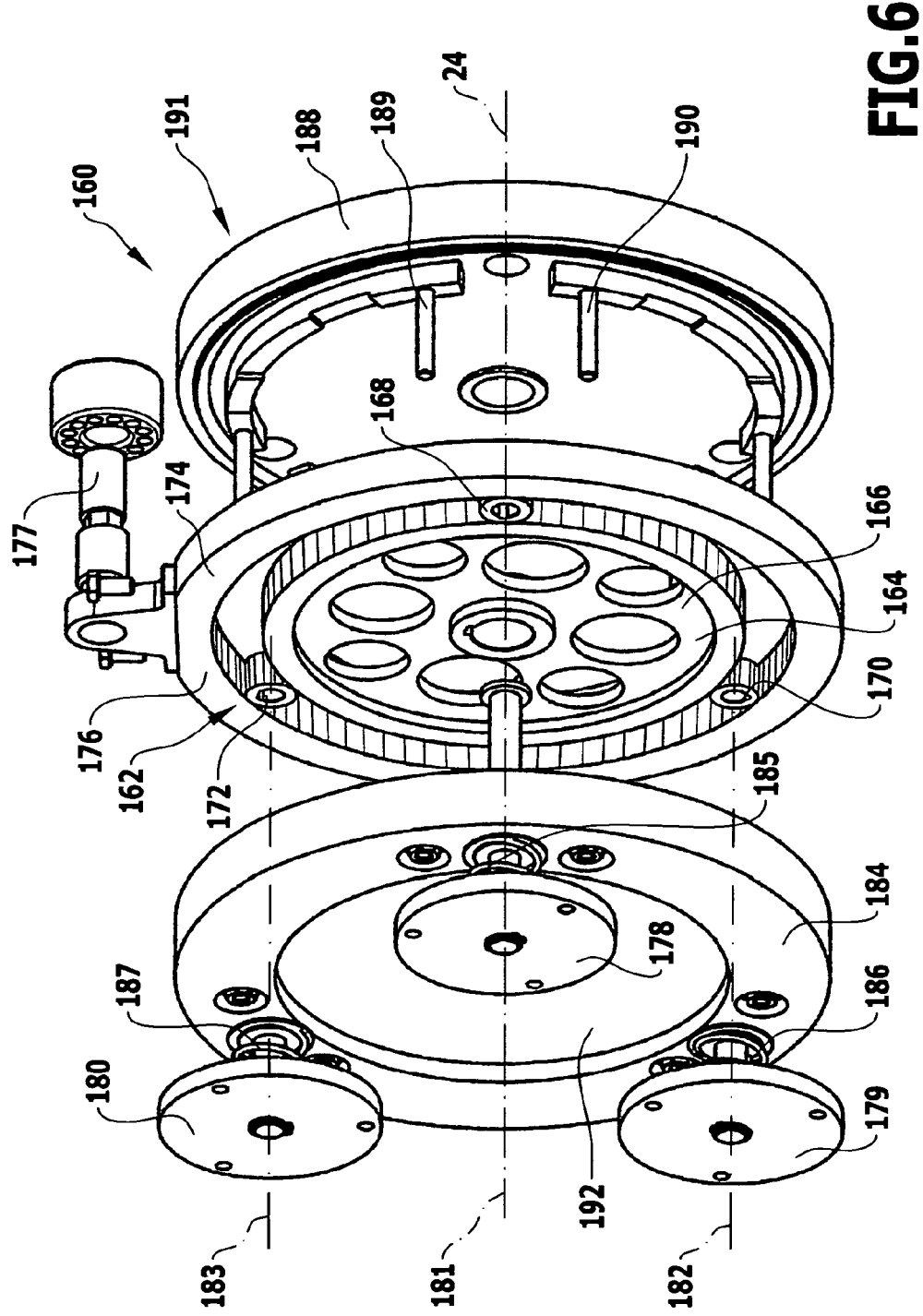
FIG. 6 is an exploded perspective view of a gear device of a third preferred embodiment of a wheel washing apparatus constructed in accordance with the invention.

FIG. 6 shows in an exploded perspective view a gear device 160 of a third preferred embodiment of a wheel washing apparatus constructed in accordance with the invention, with the remainder of said wheel washing apparatus not shown in FIG. 6. The gear device 160 may for example be used in the wheel washing apparatus 10 in place of the gear device 46 and accordingly be driven by the drive shaft 38 of the drive motor 28.

The gear device 160 comprises a planetary gear 162 having a drive wheel 164. The drive wheel 164 is configured as a sun wheel 166 whose axis is coincident with the central axis 24. The sun wheel 166 is surrounded by three planet wheels 168, 170 and 172, each of which can roll on the sun wheel 166. The planet wheels 168, 170 and 172 in turn are surrounded by a bearing wheel 174 in the form of an annulus wheel 176 on which they can also roll. The annulus wheel 176 has internal teeth, and the sun wheel and the planet wheels 168 to 172 each have external teeth, i.e., the sun wheel 166, the planet wheels 168 to 172 and the annulus wheel 176 are in each case toothed wheels that mesh with one another.

The annulus wheel 176 is capable of being fixed to the supporting device 12 by an anti-rotation device 177 that runs parallel to the central axis 24. By way of example, the anti-rotation device 177 is fixedly connected to the movable supporting part 16, in particular the front plate 20 thereof.

The planet wheels 168, 170 and 172 are connected to and rotationally fixed with respect to brush holders 178, 179 and 180 respectively in the manner set forth herein for the case of the wheel washing apparatus 10 and the brush holders 96, 102 and 108 thereof. In terms of construction and operation, the brush holders 178, 179 and 180 correspond to the brush holders 96, 102 and 108 respectively so that reference can be made in this respect to the above explanations.

The brush holders 178, 179 and 180 are each supported on a holding ring 184 of the gear device 160 for rotation about axes 181, 182 and 183 respectively defined by them. The axes 181, 182 and 183 and the central axis 24 are in each case oriented parallel to each other in pairs. The axes 181, 182 and 183 each have the same distance from the central axis 24 and the axes 181, 182 and 183 are also distributed at equal angular distances in a circumferential direction of the central axis 24.

As with the wheel washing apparatus 10, the brush holders 178, 179 and 180 can have washing brushes fixed thereto, for example the washing brushes 40, 42 and 44, whose brush discs can likewise be oriented obliquely relative to the axis 181, 182 and 183 respectively. The axes 181, 182 and 183 define brush axes of the washing brushes.

Further, the brush holders 178, 179 and 180 are biased, under the bias of a resilient bias element 185, 186 and 187 respectively, in an axial direction against the holding ring 184. The bias elements 185, 186 and 187 are coil springs. By axial pressure on the brush holders 178, 179 and 180 which can be transmitted to the washing brushes from the wheel 21 to be cleaned, the washing brushes can be displaced along the axes 181, 182 and 183 respectively.

In operation of the wheel washing apparatus, the washing brushes on the brush holders 178, 179 and 180 can be urged with a designated contact pressure against the wheel 21 to be cleaned, thereby making the coil springs shorter. If the contact pressure does not occur at a washing brush, for example because of the latter reaching between two spokes of a rim of the wheel 21 as it rotates about the central axis 24, then the respective coil spring is relaxed. This causes the washing brush to perform an axial movement so that the sides of the spokes and the rim bed can also be cleaned.

In addition, the bias elements 185, 186 and 187 can reduce the risk of damage to the wheel 21 if the gear device 160 is urged against the wheel 21 with excessive contact pressure.

Also in the case of the wheel washing apparatuses 10 and 150, provision may be made for the brush holders 96, 102 and 108 thereof to be biased axially against the gear housing 58 and to be displaceable relative thereto by use of bias elements so that the above-mentioned advantages can also be achieved with the wheel washing apparatuses 10 and 150.

On the side of the planetary gear 162 opposite the holding ring 184, the gear device 160 comprises a substantially plate-like and round carrier part 188. Protruding from the carrier part 188, parallel to the central axis 24 and in a direction towards the holding ring 184, are two pin-like connecting elements 189 and 190 for each planet wheel 168, 170 and 172. The connecting elements 189 and 190 can extend through the gap between the sun wheel 166 and the annulus wheel 176 and can be fixedly connected to the holding ring 184. The planetary gear 162 is then housed between the carrier part 188 and the holding ring 184 which in a sense form a gear housing 191 and at the same time a planet carrier. The gear housing 191 additionally has a cover element not shown in the drawing, said cover element being of plate-like configuration and capable of covering a central through-opening 192 of the holding ring 184.

In the gear device 160, the drive shaft 38 (not shown) extends centrally through the carrier part 188 and is connected to the sun wheel 166 and rotationally fixed with respect thereto. If the sun wheel 166 is rotated about the central axis 24, the planet wheels 168, 170 and 172 mesh with the sun wheel 166. This causes the washing brushes fixed to the brush holders 178, 179 and 180 to rotate about their own axes 181, 182 and 183 respectively.

Because the planet wheels 168, 170 and 172 additionally mesh with the stationary annulus wheel 176, each of them rotates about the central axis 24. The gear housing 191, i.e., in particular the carrier part 188 and the holding ring 184, are rotated.

Thus, by use of the gear device 160 in the wheel washing apparatus 10, it is likewise possible to achieve the advantages that have already mentioned in connection with the description of the wheel washing apparatus 10.

What is claimed is:

1. A wheel washing apparatus, comprising at least two washing brushes, each of which is capable of being driven in rotation about a brush axis, the brush axes of the at least two washing brushes being different from one another, wherein the at least two washing brushes are capable of being driven in rotation about a common central axis which is different from the brush axes, and wherein at least one washing brush of the at least two washing brushes has a brush disc that is oriented obliquely with respect to its brush axis.

2. The wheel washing apparatus in accordance with claim 1, wherein the wheel washing apparatus comprises three or more washing brushes.

3. The wheel washing apparatus in accordance with claim 1, wherein at least two washing brushes of the at least two washing brushes are configured to be of differing sizes.

4. The wheel washing apparatus in accordance with claim 1, wherein at least two washing brushes of the at least two washing brushes are configured to be identical to each other.

5. The wheel washing apparatus in accordance with claim 1, wherein the wheel washing apparatus comprises at least two washing brushes of the at least two washing brushes of differing sizes, with the larger washing brush having a brush disc oriented perpendicular to its brush axis and the smaller washing brush having a brush disc oriented obliquely with respect to its brush axis.

6. The wheel washing apparatus in accordance with claim 1, wherein washing brushes of the same size each have brush discs oriented at the same oblique angle relative to the respective brush axis.

7. The wheel washing apparatus in accordance with claim 1, wherein the brush axes of at least two washing brushes of the at least two washing brushes are oriented parallel to one another.

8. The wheel washing apparatus in accordance claim 1, wherein at least one brush axis of the at least two washing brushes is oriented parallel to the central axis.

9. The wheel washing apparatus in accordance with claim 1, wherein at least two brush axes of the at least two washing brushes have identical distances from the central axis.

10. The wheel washing apparatus in accordance with claim 1, wherein the brush axes are spaced at uniform angular distances from one another in a circumferential direction of the central axis.

11. The wheel washing apparatus in accordance with claim 1, wherein the rotational speeds of at least two washing brushes of the at least two washing brushes about the respective brush axis are identical.

12. The wheel washing apparatus in accordance with claim 1, wherein the rotational speeds of at least two washing brushes of the at least two washing brushes around the central axis are identical.

13. The wheel washing apparatus in accordance with claim 1, wherein the rotational speeds of the washing brushes about the respective brush axis are greater than the rotational speeds of the washing brushes about the central axis.

14. The wheel washing apparatus in accordance claim 1, wherein at least one washing brush of the at least two washing brushes overlaps the central axis in cross-section.

15. The wheel washing apparatus in accordance claim 1, wherein the wheel washing apparatus has a drive device and a gear device coupling the drive device to the at least two washing brushes for driving the washing brushes around their respective brush axis.

16. The wheel washing apparatus in accordance with claim 15, wherein the gear device comprises a planetary gear having planet wheels each of which is coupled to a washing brush and rotatable about the central axis.

17. The wheel washing apparatus in accordance with claim 16, wherein the planet wheels are each connected to and rotationally fixed with respect to one of the washing brushes.

18. The wheel washing apparatus in accordance with claim 16, wherein the gear device comprises a planet carrier on which the planet wheels are supported for rotation.

19. The wheel washing apparatus in accordance with claim 18, wherein the planet carrier is configured as a gear housing which at least partially houses the planetary gear.

20. The wheel washing apparatus in accordance with claim 18, wherein the planet carrier is capable of being driven in rotation about the central axis by the drive device.

21. The wheel washing apparatus in accordance with claim 20, wherein the planetary gear comprises a bearing wheel relative to which the planet wheels are spaced and at least one tractive-force transmission element rotatably coupling the bearing wheel to the planet wheels.

22. The wheel washing apparatus in accordance with claim 21, wherein the at least one tractive-force transmission element is a drive belt.

23. The wheel washing apparatus in accordance with claim 21, wherein the bearing wheel is a sun wheel.

24. The wheel washing apparatus in accordance with claim 20, wherein the planetary gear comprises a bearing wheel on which the planet wheels roll.

25. The wheel washing apparatus in accordance with claim 16, wherein the planetary gear comprises a drive wheel which is capable of being driven in rotation about the central axis by the drive device and on which the planet wheels roll.

26. The wheel washing apparatus in accordance with claim 25, wherein the drive wheel is a sun wheel.

27. The wheel washing apparatus in accordance with claim 26, wherein the planetary gear comprises a stationary bearing wheel on which the planet wheels roll.

28. The wheel washing apparatus in accordance with claim 27, wherein the bearing wheel is an annulus wheel.

29. The wheel washing apparatus in accordance with claim 15, wherein the gear device comprises a gear shaft which is capable of being driven by the drive device and is oriented along the central axis.

30. The wheel washing apparatus in accordance with claim 29, wherein the gear shaft is configured as a hollow shaft having at least one inlet opening for cleaning liquid on the side thereof facing away from the at least two washing brushes and at least one outlet opening for cleaning liquid on the side thereof facing towards the at least two washing brushes.

31. The wheel washing apparatus in accordance with claim 30, wherein the wheel washing apparatus has a cleaning liquid distribution device which is held on the gear shaft on the side thereof facing towards the washing brushes and to which cleaning liquid can be admitted via the gear shaft.

32. The wheel washing apparatus in accordance with claim 31, wherein the cleaning liquid distribution device comprises at least one spray arm provided with an outlet nozzle for cleaning liquid.

* * * * *